US009011952B2

(12) United States Patent
Bhushan et al.

(10) Patent No.: US 9,011,952 B2
(45) Date of Patent: Apr. 21, 2015

(54) METHOD AND APPARATUS FOR THE SEPARATION OF SEEDS FROM FRUIT PULP/SLURRY/POMACE

(71) Applicant: Council of Scientific & Industrial Research, New Delhi (IN)

(72) Inventors: Shashi Bhushan, Palampur (IN); Sakshi Gupta, Palampur (IN); Garikapati Divya Kiran Babu, Palampur (IN); Mohit Sharma, Palampur (IN); Paramvir Singh Ahuja, Palampur (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/349,305

(22) PCT Filed: Nov. 9, 2012

(86) PCT No.: PCT/IN2012/000740
§ 371 (c)(1),
(2) Date: Apr. 2, 2014

(87) PCT Pub. No.: WO2013/069028
PCT Pub. Date: May 16, 2013

(65) Prior Publication Data
US 2014/0255575 A1    Sep. 11, 2014

(30) Foreign Application Priority Data
Nov. 9, 2011    (IN) .......................... 3175/DEL/2011

(51) Int. Cl.
*A23N 4/24*    (2006.01)
*A23L 1/015*    (2006.01)
*A23L 1/212*    (2006.01)

(52) U.S. Cl.
CPC . *A23N 4/24* (2013.01); *A23L 1/015* (2013.01); *A23L 1/212* (2013.01)

(58) Field of Classification Search
CPC ....... A23L 1/2126; A23L 1/2128; A23L 4/24; A23L 1/003
USPC .............................. 426/484, 425; 99/537, 547
See application file for complete search history.

(56) References Cited

U.S. PATENT DOCUMENTS 2,440,907 A * 5/1948 Metzner ......................... 562/513
2,811,448 A * 10/1957 Rietz ............................... 426/15

(Continued)

FOREIGN PATENT DOCUMENTS

AU          453 369 B2    10/1974
WO    WO 2010/103376 A2    9/2010

*Primary Examiner* — Anthony Weier
(74) *Attorney, Agent, or Firm* — Knobbe, Martens, Olson & Bear, LLP (57) ABSTRACT

The invention pertains to a method and apparatus for separation of seeds from fruit pulp/skin/twigs, in general, coming out from juice producing industry as a waste and in particular from apple pomace. The method involves addition of apple pomace and water in a particular ratio to a vessel (1), mixing with an agitator (6, 8) at optimum rpm for sufficient period, allowed to stand followed by secondary agitation. Based on difference in bulk density, seeds were separated from pomace. The seedless pomace withdrawn from horizontal (13) or inclined (14) outlets and seeds collected in seed collection chamber were removed through bottom valve (11). The seed trap (15) provided at inclined outlet (14) helps in their retention in the vessel (1). The seedless pomace is recovered by filtration from water. This spent water can be recycled for few times and then purged. Easy to handle separation device is energy efficient, compactly designed and can be used to separate the seeds efficiently up to 97%.

29 Claims, 2 Drawing Sheets

(56) References Cited

U.S. PATENT DOCUMENTS

| | | | |
|---|---|---|---|
| 4,452,822 A * | 6/1984 | Shrikhande | 426/49 |
| 4,981,220 A | 1/1991 | Kolodesh et al. | |
| 6,544,581 B1 * | 4/2003 | Shrikhande et al. | 426/655 |
| 6,988,622 B1 | 1/2006 | Victor | |
| 7,757,866 B2 * | 7/2010 | McCutchen | 210/512.3 |
| 2012/0135109 A1 * | 5/2012 | Paeschke et al. | 426/50 |

* cited by examiner

METHOD AND APPARATUS FOR THE SEPARATION OF SEEDS FROM FRUIT PULP/SLURRY/POMACE

FIELD OF THE INVENTION

The present invention relates to the method and apparatus for the separation of seeds from the fruit pulp/slurry/pomace, which will be utilized for further preparation of value added products/applications. More particularly, the present invention relates to an apparatus and method for separating seeds from apple pomace available as a waste from the juice producing industries and its utilization for the preparation of value added food products such as extraction of antioxidants, pectin, biopolymer, dietary fibre, bakery flour, fermented product development, animal feed etc.

The method and device/apparatus, in general, are useful to separate the solids from solids using liquid as carrying medium by taking advantage of difference in the bulk density of solids separated. One of the applications of the invention can be found in separating the mixture containing seeds and pulp coming out of the fruit juice processing industries as a waste/spent/residue and the products being separated are utilized for the preparation of value added products.

BACKGROUND OF THE INVENTION

Reference may be made to M. S. Kolodesh and W. Cash. Method of and apparatus for separating seeds from a juice/juice sac slurry, U.S. Pat. No. 4,981,220, dated Jan. 1, 1991, wherein the juice slurry/juice sac of citrus fruit collected from the rag separator fed to a seed separator. The seed separator works on the difference in resiliencies or bouncing behaviour of seeds and juice sacs for separation, of seeds. It includes a vibrating stand, inclined perforated bed having a number of channels with distinct ridges and valleys. The perforated bed has a number of upwards ridges arising from the bed's surface. During separation, the residue gets deposited on the bottom end of the bed's upper-side. The vibration of perforated bed caused by its base helps in sending the sacs to collection point. The rising ridges spaced out the clumps of fruit juice sacs during their upward movement to free the seeds present in these sacs. On the basis of different bouncing behaviours, seeds bounce relatively higher than sacs and fell down the bed, collected at closing point and disposed-off. The recovered juice sacs used for adding into prepared fruit product or later mixed with processed juice. The drawbacks are, when the mixture/feed contains fruit pulp and seed in gel form becomes highly sticky in nature, thus making seed separation process inefficient. Further, the pulp gets exposed to the air, as the apparatus is an open chamber, which in turn reacts with air and chemical reactions such as oxidation, polymerization etc. take place, leading to loss of flavour and colour. The application of this invention is only limited to where the difference in bouncing characteristics of the seeds and the fruit sacks are high.

Reference may be made to Marvin Schulman, Richard B. Stevenson. Seeds separating apparatus and method, U.S. Pat. No. 4,609,110, dated Sep. 2, 1986 wherein the apparatus consists of two parallel spaced liberally revolving roller lengthening diagonally across the surface of upper conveyor belt. The roller has smoother surface in contrast to belt (with rougher finish). The fruit sacs move along the rough surface of conveyor belt while separated seeds fall along the smooth surface of the roller. The fruit residue while passing through the gap is subjected to watering onto the surface of conveyor belt. Upstream of the second roller forming a tapered gap with the belt surface was used for the separation of smaller sized seeds or seed particles that are left in the fruit residue. The drawbacks of the said invention are: fragmentation of the seeds due to rolling, which can release undesirable compounds and may impart off-flavour. Inefficient separation of the seeds at the first roller forced inventors to provide a second roller, wherein a liquid spraying device sprays water to detach/separate the seeds from fruit rags. However, the machine does not provide proper drainage/collection of sprayed water, making soggy working space around the machine. This created unhygienic conditions and susceptibility to food contamination.

Reference may be made to William A. Kirk, Citrus seeds separator, U.S. Pat. No. 3,330,410, dated Jul. 11, 1967 wherein seeds are separated from citrus pulp after the extraction of juice. The citrus fruit rag is fed to the hopper, underneath the hopper number of endless conveyor belts were mounted at different altitude on a frame in both directions i.e. lengthwise and transversely. The rag moving on an inclined conveyor belt, discharged from the uppermost portion of the first belt and would fall down on the surface of next lower belt, inclined in opposite direction from the first belt. Falling of the matter from a height causes distress; this resulted in separation of seeds from the pulp. Appropriate motors and gearing system were provided for the movement of belts. The seedless pulp was received over the last conveyor belt and collected separately. The drawbacks of the said invention are: lack of seed collection chamber/point and the seeds rolling off the conveyer belt and dropping on to the ground, resulting in the loss/wastage of seeds. The seeds remained adhered to the pulp due to high moisture and gumminess nature of the pulp, thus leading to inefficient separation of seeds. The machine also required high energy input to move the endless conveyer belts by electric motors and hence, increased the capital investment. Throughput of the machine is very less as the feed needs to be spread over the conveyer belt in a thin layer to separate the seeds from the pulp, thus require huge infrastructure and more energy consumption.

Reference may be made to Xianghua Chen, Method for separating apple seed in apple juice preparation process and centrifugal separator, China Patent Application 1701853A dated: 30 Nov. 2005 wherein apples are fed to the centrifugal separator during juice processing. It consists of centrifuge separators (centrifuge chamber, shaft mounting to two end plates), filter sieve, power machine, transmission gear box, air blower, mechanical dehydration device or horizontal screw-type squeezer or oil presser or vertical screw-type squeezing device, gravity separators etc. The wet material was dewatered by squeezing and then fed to the gravity separator fixed with air blowers. Under the effect of vibrating sieve (three numbers) at specific wind speed, apple seeds were separated along with small quantity of fruit flesh, peels and stems. The drawbacks of the said invention are: the browning of apple pomace due to oxidation—an undesirable character for further value addition. In general, browning results from the exposure of pomace to air thus causing oxidation of polyphenols in the presence of enzyme (polyphenol oxidase) present in the apple fruits. The squeezing device used during dewatering of the wet material causes the crushing/fragmentation of seeds as well, which leads to release of toxic compounds such as cynogenic glycosides. The capital investment is very high as it consists of many electric motors, vibrating sieves for separating the seeds from fruit pulp/skin/stems in different process equipments including centrifuge, air blower, mechanical dehydration device or horizontal screw-type squeezer or oil presser or vertical screw-type squeezing device, gravity separators etc.

Reference may be made to Kaur Devinder, Flotation-cum-sedimentation system for skin and seed separation from tomato pomace, Journal of Food Engineering 71(2005) 341-344 wherein tomato seeds and skin are separated in flotation-cum-sedimentation system consisting of mixing tank, settling and water collecting tanks, seed collecting trays and recirculation pump. The pomace is fed to the mixing tank, agitated and later the mixture is moved to a series of sedimentation tanks for separation of seeds from skin/flesh. The skin/flesh being lighter in weight floated at the top and collected through the upper outlet, whereas seeds settled at the base of the tank and are removed from bottom outlet. The drawbacks of the said invention are that when pulp is exposed to the air, as the mixing tank is an open chamber, it leads to oxidation. It requires huge space to house a number of tanks. The system does not provide single window for seed collection from three settling tanks.

Fruit processing industries are facing a lot of problem in disposal of bio-waste generated during pre and post processing of fruits & vegetables. Besides environmental pollution on dumping sites, it also poses possible health hazards due to growth of undesirable microbes. Even mere dumping of such wastes causes economic losses to the industries. Therefore, value addition of such wastes will not only reduce the environmental pollution, but also give the additional returns to such industries. Efficient separation of seeds will provide advantage of utilization of seedless pomace for preparation of value added products. Commercial apple juice processing units purge pomace as a waste from the factory. The present invention pertains to method and apparatus for the separation of seeds from fruit pulp/slurry/pomace, in general, coming out from food processing industry as a waste and in particular from apple pomace, which essentially consists of skin, pulp, seeds and twigs/pits. Although for many years, it was regarded as a waste; at present apple pomace is being utilized for the production of value added products. Apple pomace comprises 95% skin/flesh, 4% seeds and 1% twigs/stems (Bhushan et al., 2008. *Critical Reviews in Biotechnology*, 28:285-296). Apple pomace contains 66.4-78.2% (wb) moisture and 9.5-22.0% carbohydrates (Sun et al. 2007 *Food Science Technology International* 13(2):91-97) and it also contains 26.4% dry matter (DM), 4.0% proteins, 3.6% sugars, 6.8% cellulose, 0.38% ash, 0.42% acid and calcium, 8.7 mg/100 g of wet apple pomace (Vasil'ev et al. 1976. Konservnaya-i-Ovoshchesushil' naya-Promyshlennost. 3:32-34). Polyphenols in apple pomace are: flavanols (catechin, epicatechin, procyanidins), flavonols, hydroxycinnamates and dihydrochalcones (Schieber et al., 2003. *Food Sci. Emerg. Technol.* 4:99-107). Among flavonoids quercetin and its glycosides are most abundant in plants, including apples. In apple pomace Quercetin-3-O-β-D-galactopyranoside (hyperin), Quercetin-3-O-β-D-glucopyranoside (isoquercitrin), Quercetrin-3-O-β-D-xylopyranoside (reynoutrin), Quercetrin-3-O-α-L-arabinofuranoside (avicularin) and Quercetrin-3-O-α-L-rhamnopyranoside (quercitrin) are present in largest quantities (Lu & Foo, 1997. *Food Chem.* 61(1-2): 29-33).

Apple seeds are generally oval in shape with pointed tip at one end, measuring about 5 mm diameter and 1.5 mm in thickness (depending upon maturity and variety). Apple seeds, the significant part of apple pomace, are rich in fatty oil content (28%) and supplementing proteins (34%). The main component of apple seed (fatty) oil is linoleic acid (ca. 50%) (Lu and Foo, 1997. *Food Chem.* 61(1-2): 29-33) and also contain significant amount of amygdalin and phloridzin (Lu and Foo, 1998. *Food Chemistry*, 61(1/2): 29-33) and phosphorous, potassium, magnesium, calcium and iron (Yu et. al., 2007. *International Journal of Food Engineering*, 3(5) Article12). The metabolism of amygdalin produces hydrogen cyanide, a potent toxin. β-Glucosidase, one of the enzymes that are present in the human intestine, catalyse the release of cyanide from amygdalin leads to an unpredictable and potentially lethal toxicity, when amygdalin is taken orally (Newton et. al., 1981. *West. J. Med.* 134 (2): 97-103). Injection of purified amygdalin can cause sewer toxicity and death due to cyanide (Lerner, 1981. *CA Cancer J Clin.* 31 (2): 91-95). The seedless apple pomace consisting of flesh, skin etc. can be used potentially for producing value added products such as dietary fiber, protein, pectin, natural antioxidants, pigments and phenolic compounds (Kolodziejczyk et. al., 2007. *Pol. J. Food Nutr. Sci.* 57: 291-295; Lu and Foo, 2000. *Food Chem.* 68(1):81-5). It is, therefore, extremely important to develop an economical method and apparatus for effecting rapid and efficient separation of seeds from apple pomace for commercial production of value added products.

At present, the apple pomace is either dumped as landfill or used to some extent for animal feed. Apple pomace is highly nutritious and therefore, its dumping is not only an economical loss, but also a loss of nutritional bioresource. Therefore, efficient utilization of this bio-waste to improve the commercial feasibility of juice processing industries is the need of the hour. Thus the apparatus and the methods mentioned above for the separation of seeds have one or other major drawbacks like improper seed collection point, water drainage system, insufficient separation of seeds from pulp/skin/flesh, release of undesirable compounds due to seeds fragmentation or splitting/crushing, causing seed damage/loss, open seed separation process causes loss of flavor and color due to oxidation through direct air contact, unhygienic separation leads to contamination/degradation, require more attention/manpower during processing, more capital investment, operational cost, less throughput, high space required for infrastructure.

The present invention contemplates a method and device operated in batch and continuous mode designed, fabricated and calibrated to produce a clean, highly efficient, rapid separation of seeds from the apple pomace in an economical manner, that avoid the splitting or fragmentation of the seeds which can otherwise release undesirable cyanogenic glycosides into the extracted apple pomace.

The pressed apple pomace typically comprises of fruit skin cell wall materials and pulp surrounding gelatinous mucilage having apple seeds embedded therein. Therefore, it is quite difficult to separate seeds from the pomace by using traditional straining methods and devices, which inefficiently separate the seeds from skin/flesh, pulp, etc.

SUMMARY OF THE INVENTION

The main object of the present invention is to provide a method and apparatus for the separation of fruit seeds from fruit pulp/slurry/pomace which obviates the drawbacks of the hitherto known prior art as detailed above.

Another object of the present invention is to provide an apparatus for seed separation from fruit pulp/pomace without seed damage.

Still another object of the present invention is to provide an apparatus for seed separation from fruit pulp/slurry/pomace without extraction of undesirable chemical compounds from fruit peel/flesh/twigs/pits and seeds.

Yet another object of the present invention is to provide a rapid method/technique to separate seeds from fruit pulp/slurry/pomace by taking the advantage of the density difference between the contents being separated.

Another object of the present invention is to provide an efficient method for producing fruit or vegetable pulp/slurry/pomace having high quality and devoid of degraded products formed by chemical oxidation, polymerization etc. that might occur in the prior arts due to inefficient design(s) and/or method(s).

Still another object of the present invention is to provide an apparatus and method for separating the seeds from fruit pulp/slurry/pomace by utilizing less space for installation/erection, manpower, electrical energy etc.

Yet another object of the present invention is to provide an efficient, low cost, high throughput device for separating the seeds from fruit pulp/slurry/pomace.

Another object of the present invention is to provide an economically viable, energy efficient, eco-friendly method and apparatus for separating the seeds from fruit pulp/slurry/pomace with minimum loss of seeds and pulp/skin.

Fruit and vegetable processing industry are facing huge problem in disposing off residues left after primary processing. Apple pomace, contains nutrients in high quantity, is presently being dumped by fruit processing industries, which is not only an economical loss, but also a loss of nutritional bioresource. Therefore, efficient utilization of this bio-waste, through value addition, to improve the commercial feasibility of juice processing industries is the need of the hour.

The present invention relates to an apparatus consisting of a vessel having charging holes for feed and water and an agitator to disperse the feed containing seeds and other solid residue by means of agitation. The vessel has been designed with a certain length to diameter (L/D) ratio to have better separation of the seeds and the seedless pomace. At the bottom of the vessel, a perforated foldable grid/sieve is placed for seed separation and the outlets for withdrawing the water along with the fruit pulp/flesh/skin are attached at a particular height above the grid for operating the device batch-wise as well as in a continuous mode by changing its inclination with respect to the vessel. A seed trap is designed and fixed inside the vessel at a point where the inclined outlet is placed to allow the seedless pomace and to retain the seeds.

Further, the present invention relates to a method involving addition of apple pomace and water in a particular ratio to the seed separation vessel. The mixture is then agitated at optimum revolutions per minute (rpm) for a period sufficient enough to completely disperse the pomace lumps (containing seeds and skin/flesh/pulp). After achieving the desired degree of dispersion of the feed (containing seeds and skin/flesh/pulp) through mixing, contents were allowed to stand to settle-down the seeds at the bottom. The pulp/skin suspended in the water in batch type operation, is removed through the horizontal outlet; whereas, during continuous mode of operation, a homogenous feed along with water may be fed to the vessel either through the inclined pipe or a separate horizontal inlet welded at the middle portion of the vessel. In this case, the seedless pomace is withdrawn from water inlet welded on the top conical lid: the seeds will settle-down in the vessel itself due to difference in their bulk densities. Seeds thus settled at the bottom are passed through the sieve having hole diameter sufficient enough to allow/pass the seeds, to collect them in the seed separation chamber. The seeds are then removed through the flush bottom valve at the end of the operation or when the chamber is fully occupied. The seedless pomace along with water, thus collected, is filtered by known means of filtration equipment to recover the seedless pomace and the spent water. This spent water can be recycled for a few times and then purged. This energy- and process-efficient, compact design having separation and collection chambers in the same unit can be used to separate the seeds on batch-wise or continuous-type operation; and the method gives high throughput, rapid separation, requires less installation space, manpower during operation thus has a good potential in the food processing industry.

BRIEF DESCRIPTION OF THE DRAWINGS

The present invention is illustrated in FIG. 1 of the drawing(s) accompanying this specification.

DETAILED DESCRIPTION OF THE PREFERRED EMBODIMENT

Figure 1:
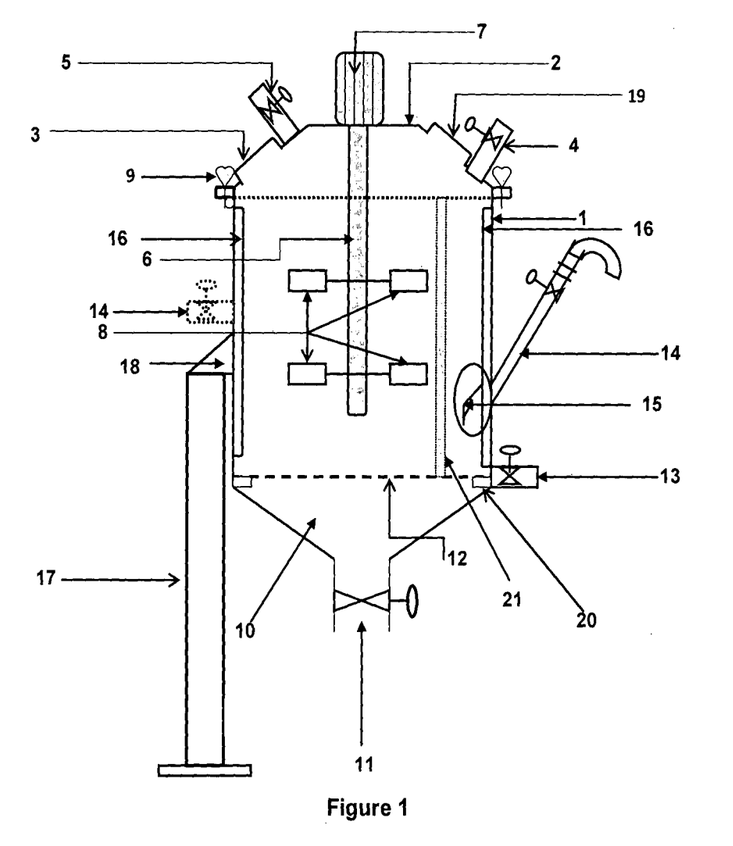
FIG. 1 represents elevation of the seed separation unit
Figure 2:
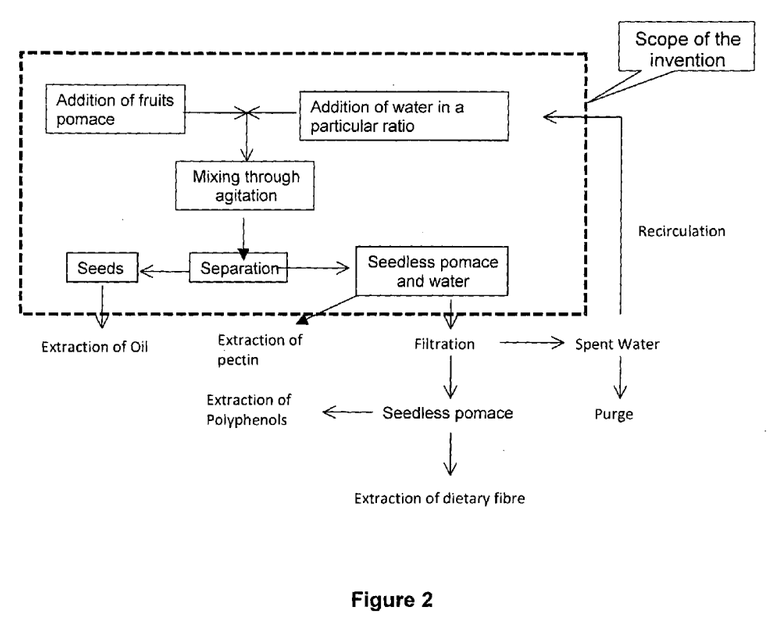
FIG. 2 represents the process flow diagram of seed separation unit

The detailed drawing and a process flow diagram of the said invention furnished as below.

The main vessel (1) having length to diameter ratio in the range of 0.5 to 5:1, to contain the pomace, is provided with top lid (2) consisting of feed inlet (3), water inlet (4), and air vent (5). At the centre of the said top lid (2) an agitator shaft (6) connected with electric motor (7), impellers (8) for dispersing the feed contents are provided. The top lid (2) is removable, fixed with known means preferably nut-bolts and a gasket (9). The bottom end of the vessel (1) is provided with seed collection chamber (10), consisting of seed drain valve (11), foldable sieve (12) having holes placed inside the vessel (1). The horizontal outlet (13) for removing the seedless pomace during batch mode operation is fixed at the bottom side of the vessel (1). In continuous mode of operation, a homogenous feed along with water may be fed to the vessel (1) either through the inclined pipe (14) or a separate horizontal inlet welded at the middle portion of the vessel (1). In this case, the seedless pomace is withdrawn from water inlet (4) welded on the top conical lid (2); alternatively the homogenous feed may be fed to the vessel(s) (1) through feed inlet (3) and seedless pomace along with water could be removed continuously through inclined outlet (14). A seed trap (15) is designed and fixed inside the vessel at a point where the inclined outlet is placed to allow the seedless pomace while retaining the seeds. Suitable baffles (16) are fixed to the vessel (1) to enhance the dispersion efficiency. The vessel is provided with supporting legs (17), lugs (18) to held the vessel (1) vertically upright. The feed inlet (3) is optionally provided with lid (19) fixed with glass for monitoring the contents. The sieve (12) is placed above the sieve supporting ring (20).

The pomace containing seeds and the pulp/flesh/skin/twigs along with water are fed, in a particular ratio, to the seed separation vessel (1) through feed inlet (3) and water inlet (4) provided on the top lid (2). The mixture was then mixed with an agitator (6, 8) operated by an electric motor (7) at an optimum speed (controlled by variable frequency drive) for a period sufficient enough to completely disperse the pomace lumps (containing seeds and skin/flesh/pulp/twigs). After achieving the desired dispersion of the feed (containing seeds and skin/flesh/pulp/twigs) through mixing, contents were allowed to stand to settle-down the seeds at the bottom of the vessel (10) through sieve (12). The pulp/skin suspended in the water is removed through the horizontal outlet (13) while operated in a batch mode; whereas in continuous type of operation, the water along with seedless pomace is continuously removed from the vessel through the inclined outlet (14); the seeds will settle-down in the vessel itself due to difference in their bulk densities. The settled seeds are passed through the sieve (12) having hole diameter sufficient enough to allow/pass the seeds, to collect them in the seed separation chamber (10). The seeds are then removed through the seed drain valve (11) at the end of the operation or when the chamber is fully occupied. The seedless pomace along with water, collected from the outlets (13 & 14), are filtered by known means of filtration equipment to recover the seedless pomace and the spent water. This spent water can be recycled for a few times and then purged.

Accordingly, the present invention provides a method and apparatus for the separation of seeds from fruit pulp/slurry/pomace which comprises one or more vessel(s) (1), having top lid (2) consisting of one or more feed inlet(s) (3), water inlet(s) (4), air vent(s) (5), agitator system(s) having shaft (6), electric motor (7), impellers (8) provided at the centre of the said top lid (2) for dispersing the feed contents; the top lid (2) is removeably fixed with known means preferably by plurality of nut-bolts/gasket (9) and the bottom end of the vessel(s) (1) is provided with seed collection chamber (10), consisting of one or more seed drain valve(s) (11), foldable sieve(s) (12) having plurality of holes suitable for separating various sized seeds; one or more horizontal outlet(s) (13) fixed at the bottom side of the vessel(s) (1) for removing the seedless pomace during batch mode operation; alternatively, during continuous mode of operation, a homogenous feed along with water may be fed to the vessel (1) either through the inclined pipe (14) or a separate horizontal inlet welded at the middle portion of the vessel (1) and in this case, the seedless pomace is withdrawn from water inlet (4) welded on the top conical lid (2); alternatively the homogenous feed may be fed to the vessel(s) (1) through feed inlet (3) and seedless pomace along with water could be removed continuously through inclined outlet (14) plurality of suitable baffles (16) are fixed vertically to the vessel(s) (1) to enhance the dispersion efficiency; the vessel(s) (1) is/are provided with plurality of supporting legs (17), lugs (18) to held the said vessel(s) (1) vertically upright; the feed inlet (3) is optionally provided with lid (19) fixed with glass for monitoring the contents; a sieve supporting ring (20) is provided at the bottom of the vessel(s) (1) to hold the said sieve(s) (12).

In an embodiment of the present invention, the vessel(s) (1) is designed to have length to diameter ratio in the range of 0.5 to 5:1 to separate the seeds from the pulp/skin/flesh depending upon their settling characteristics.

In another embodiment of the present invention, the seed collection chamber (10) is designed either in cone shape, or dished end or torispherical or cylindrical blind end to hold the separated seeds.

In yet another embodiment of the present invention, one or more horizontal outlet(s) (13) is (are) fixed above the foldable sieve (12) at the bottom portion of the vessel(s) (1) for withdrawing seedless pomace during batch mode of operation In still another embodiment of the present invention, one or more horizontal outlet(s) (13) is (are) fixed at an angle ranging from 80-90° with reference to the vessel(s) (1) for withdrawing seedless pomace during batch mode of operation In another embodiment of the present invention, one or more horizontal outlet(s) (13) is (are) fixed on any side of the vessel(s) (1) for withdrawing seedless pomace during batch mode of operation In yet another embodiment of the present invention, the length of inclined outlet(s) (14) is flexibly extended by providing and fixing suitable length of pipe by known means for maintaining the contents level inside the tank In still another embodiment of the present invention, the angle of inclined outlet(s) (14) may be fixed in the range up to 80° preferably at 40° with respect to the vessel (1).

In another embodiment of the present invention, plurality of impellers (8) are flexibly fixed at any desired point on the said shaft (6) by providing known means preferably by nut-bolts.

In yet another embodiment of the present invention, plurality of impellers are adjustably fixed at any desired angle with respect to the said shaft (6) by providing known means preferably by nut-bolts.

In still another embodiment of the present invention, the angle between the two covers of seed trap(s) (15) is in the range of 45° to 130°.

In another embodiment of the present invention, the position of horizontal outlet(s) (13) is/are fixed above the foldable sieve (12) preferably at 1" height.

In another embodiment of the present invention, the position of inclined outlet(s) (14) is/are fixed above the foldable sieve (12) preferably at 2" height.

In yet another embodiment of the present invention, plurality of sight/light glass(s) (21) are provided on the cylindrical portion of the vessel(s) (1) to monitor the flow dynamics, mixing and separating of the contents inside the vessel(s) (1)

In another embodiment of the present invention, a method involving addition of fruit pomace and water through respective charging inlets (3 & 4) to the seed separation vessel(s) (1) and the contents were mixed by agitating system (6,7,8) to uniformly disperse/suspend the pomace lumps (containing seeds, twigs, pulp and skin) in the water and after achieving the desired degree of dispersion of the feed (containing seeds, twigs, pulp and skin) through mixing, the contents were allowed to stand-still to settle-down the seeds at the bottom and the twigs, pulp and skin to suspend in the water due to difference in their bulk densities followed by a secondary mixing for a shorter period for allowing the passage of settled seeds above sieve through the sieve hole to the seed collection chamber (10) and the seedless pomace is removed through the horizontal outlet (13) in a batch type operation; whereas in continuous type of operation, a homogenous feed in water is fed to the vessel (1) either through the inclined pipe (14) or a separate horizontal inlet welded at the middle portion of the vessel (1) and the seedless pomace is withdrawn from water inlet (4); alternatively the homogenous feed may be fed to the vessel(s) (1) through feed inlet (3) and seedless pomace along with water could be removed continuously through inclined outlet (14); the seed trap (15) helps in retaining the seeds in side the vessel(s) (1) and allow the passage of the seedless pomace through inclined outlet (14); the seeds thus collected in the seed collection chamber (10) were removed through the seed drain valve (11) at the end of the operation or when the chamber is fully occupied; the seedless pomace along with water is collected from the horizontal outlet (13) or inclined outlet (14) or water inlet (4) is filtered by known means of filtration equipment to recover the seedless pomace from the spent water, where the latter can be recycled for a few times and then purged.

In yet another embodiment of the present invention, the pomace and water are fed to the said vessels (1) in the ratio ranging from 1:20 to 1:55 for optimum separation of seeds from seedless pomace.

In still another embodiment of the present invention, the speed of the agitator is maintained in the range from 30 to 200 rpm to completely disperse the pomace lumps.

In another embodiment of the present invention, the contents are primarily mixed for a period ranging from 5 to 30 min in batch mode of operation.

In yet embodiment of the present invention, after mixing pomace and water, the contents are allowed to settle for a time period ranging from 5 to 30 min in batch mode of operation.

In still another embodiment of the present invention, after settling period, the contents are secondarily mixed for a period ranging from 30 sec to 15 min in batch mode of operation.

In yet another embodiment of the present invention, the flow rate of pomace in the feed is maintained in the range from 400 to 900 g/min (DW), in the continuous mode of operation.

In another embodiment of the present invention, the water flow rate is maintained at in the range from 8 to 50 l/min, in the continuous mode of operation.

The process of seed separation as described in the present invention involved addition of feed pomace, mass ranging from 10 to 15 kg (dry weight basis), containing seeds, skin/flesh and twigs in the rage of 5 to 10%, 87 to 92% and 2 to 3%, respectively in to the vessel along with water in the ratio ranging from 1:2 to 1:30. After adding the said contents, they were mixed thoroughly with the help of agitator connected to a motor with revolutions per minute (rpm) ranging from 30 to 200 for an initial agitation time ranging from 2 to 60 min. The contents were allowed to settle for a time period ranging from 1 to 30 min. Further, the contents were again mixed for a secondary agitation time ranging from 0.5 to 10 min followed by draining of the seedless pomace from the horizontal outlet placed above the false bottom and the seeds settled in the seed collection chamber were discharged through the seed drain valve. The seedless pomace collected in the receiver contained pomace, seeds and twigs ranging from 94 to 98%, 0.05 to 3.5% and 2 to 3%, respectively; whereas the seed collection chamber contained 81 to 92% seeds, 6 to 15% pomace and 1 to 5% twigs.

The present invention contained a vessel having length to diameter (L/D) in the ratio of 0.5 to 5:1. The said vessel, made up of stainless steel, having thickness ranging from 2 to 5 mm is attached to a cone type bottom end provided with a discharging valve having inner diameter ranging from 25 to 100 mm. Another cone type end is fixed at the top side of the said vessel which is provided with charging holes having inner diameter ranging from 25 to 50 mm for feeding water and 80 to 100 mm pomace, agitator assembly having motor capacity 0.5 to 1 hp, shaft having 25 to 50 mm diameter fixed with impellers at different heights for mixing the contents in the vessel. Baffles, having 25 to 50 mm width and 2 to 5 mm thickness, are welded on the inner side of the vessel wall vertically to cover whole length from top to false bottom. The top (cone-type) lid is attached with the vessel through nut-bolt arrangement provided on the flanges. A set of glasses (light and sight) having 50 to 100 mm diameter, for monitoring the contents inside the vessels are provided on the top lid or alternately the same may be provided vertically over the cylindrical portion of the vessel. A false bottom, having thickness ranging from 1 to 3 mm and diameter of the holes ranging from 8 to 12 mm, is placed at the bottom of the cylindrical vessel. The horizontal pomace outlet is provided with a valve having inner diameter ranging from 50 to 100 mm is welded just above the false bottom positioned at the lower part of the vessel to remove the seedless pomace intermittently from the vessel. Supporting legs 3 to 4 numbers are welded onto the cylindrical portion of the vessel to hold the said vessel vertically upright.

The vessel was designed with certain length to diameter (L/D) ratio to have better separation of the seeds and the seedless pomace. At the bottom of the vessel, a perforated foldable/non-foldable grid/sieve is placed for seed separation and the outlets for withdrawing the water along with the fruit pulp/flesh/skin are attached at a particular height above the grid for operating the device in batch-wise as well as continuous mode by changing its inclination with respect to the vessel. A seed trap is designed and fixed inside the vessel at a point where the inclined outlet is placed to allow the seedless pomace exit and to retain the seeds. Further, the present invention relates to a method involving addition of apple pomace and water in a particular ratio to the seed separation vessel. The mixture was then agitated at optimum revolutions per minute (rpm) for a period sufficient enough to completely disperse the pomace lumps (containing seeds and skin/flesh/pulp). After achieving the desired degree of dispersion of the feed (containing seeds and skin/flesh/pulp) through mixing, the contents were allowed to stand-still to settle-down the seeds at the bottom and the pulp/skin suspended in the water in batch type operation, is removed through the horizontal outlet; whereas in continuous type of operation, the water along with seedless pomace is continuously removed from the vessel through the inclined outlet; the seeds would settle-down in the vessel itself due to difference in their bulk densities. Seeds, thus settled at the bottom, are passed through the sieve having hole diameter sufficient enough to allow/pass the seeds, to collect them in the seed separation chamber. The seeds are then removed through the bottom valve at the end of the operation or when the chamber is fully occupied. This energy- and process-efficient, compact design having separation and collection chambers in the same unit and can be used to separate the seeds on batch-wise or continuous-type operation; and method gives high throughput, rapid separation, requires less installation space and manpower during operation has good potential in the food processing industry.

The present invention relates to an apparatus consists of a vessel having length to diameter ratio in the range of 0.5 to 5:1, for mixing of feed contents (pomace), The separation unit having removable cone shape top lid fixed with nut-bolts and gasket provided above the vessel consisting of feed inlet with see through glass for monitoring the contents, water inlet, and air vent. An agitator shaft connected with electric motor having impellers fixed on the agitator rod for dispersing the feed contents are provided inside the vessel at the center of the said top lid. Bottom of the vessel having collection chamber for seeds, above which sieve supporting ring is designed to hold foldable sieve having holes. Seed drain valve is provided at the bottom end of seed collection chamber. The bottom side of the pomace mixing vessel, a horizontal outlet is provide for removing the contents during batch wise operation and above the said horizontal outlet an inclined outlet is fixed to withdraw the contents during continuous mode of operation. A seed trap is designed and fixed inside the vessel at a point where the inclined outlet is placed to allow the seedless pomace while retaining the seeds. A set of baffles are fixed inside of vessel to improve the dispersion of the feed contents for better separation. The vessel is provided with supporting legs to hold the vessel vertically upright.

Apple pomace containing seed, pulp/flesh/skin along with water mixed in a particular ratio is fed to the seed separation vessel (1) through feed (3) and water inlet(s) (4). The above mixture is then mixed properly with impeller (8) of the agitator at an optimum speed for a definite time period sufficient enough for dispersing pomace lumps. After proper mixing, contents of pomace are allowed undisturbed for settling of seeds in collection chamber (10) through the sieve (12) having hole diameter sufficient enough to facilitate the easier passage of seeds inside the seed collection chamber (10). Then the contents are again mixed for a particular time period to disperse the pomace settled above sieve (12) that blocked the passage of seeds through the sieve (12). The pulp/skin suspended in the water above sieve (12) due to difference in bulk density of the feed (pomace) contents, which is removed through horizontal opening (13) in batch type operation and for continuous type of operation, the water along with seedless pomace is removed continuously through the inclined outlet (14). Alternatively, during continuous mode of operation, a homogenous feed along with water fed to the vessel (1) either through the inclined pipe (14) or a separate horizontal inlet welded at the middle portion of the vessel (1). In this case, the seedless pomace is withdrawn from water inlet (4) welded on the top conical lid (2). The seeds are than removed through the seed drain valve (11) at the end of separation process or filling up of the seed collection chamber (10) to its full capacity. The seedless pomace thus collected is filtered through known means of filtration methods to get rid of spent water. The spent water thus obtained may be recycled till its saturation with soluble matter and then purged out.

EXAMPLE-1

One kilogram apple pomace (dry weight basis, DW) containing 65.28 g seeds (DW), 915.22 g (DW) skin/flesh, 19.5 g (DW) twigs, were fed to the vessel (1) along with 39 L water. The overall pomace to water ratio was 1:39. The contents inside the vessel (1) were mixed with the help of an agitator connected to an electrically driven motor (7) at a speed of 130 rpm for about 15 min. Then the contents were allowed to settle for 10 min followed by secondary mixing for about 5 min. In apple pomace, fruit skin cell wall materials and pulp surrounding gelatinous mucilage having seeds embedded therein were got separated and due to higher bulk density they settled at the bottom of the vessel (1) and later passed through the sieve (12) holes due to continuous mixing. After completion of secondary mixing, the pomace along with water was drained from the horizontal outlet (13) and collected in a receiver. After draining the pomace and water, the process was repeated by charging 1 kg pomace along with 35 L water for another 11 batches. At the end, the seeds were collected by opening the seed drain valve (11) of the seed collection chamber (10). The composition of feed and the recovered products (seedless pomace and seeds) coming out of the seed separators is given in Table 1.

TABLE 1

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 10,982.64 | 10,906.12 | 76.52 |
| 2 | Seeds | 783.36 | 16.69 | 766.67 |
| 3 | Twigs | 234.00 | 213.90 | 20.10 |
| Total | | 12,000.00 | 11,136.71 | 863.29 |

Out of 10,982.64 g (DW) seedless pomace in the feed, 10906.12 g was recovered in the receiver, which accounts for 99.3% recovery. Similarly, out of 783.36 g seeds in the feed, 766.67 g were recovered in the seed collection chamber accounting to 97.87% recovery.

EXAMPLE-2

This experiment essentially corresponds to that of Example 1. However, the ratio of apple pomace to water was maintained at 1:29 by charging 1 kg (DW) apple pomace, containing 47.81 g seeds, 934.76 g skin/flesh, 17.43 g twigs and 29 L water through feed opening (3) and water inlet (4), respectively in to the mixing vessel (1). The material was mixed through agitation at 130 rpm for a period of 15 min followed by 10 min settling time. Later, a secondary agitation was given at the same rpm for 5 min so that seeds were got settled above sieve, due to density difference, might pass through the sieve (12) holes to the seed collection chamber (10). Seedless pomace having low bulk density, with respect to seeds, floated in the water and was collected from the horizontal outlet (13) along with water by opening the valve. The above process of seed separation was repeated for another 11 batches, till the time the seed collection chamber (10) was fully occupied with the seeds. After removing the seedless pomace from 12 batches from the horizontal outlet (13), the seed drain valve (11) at the bottom of the collection chamber (10) was opened to collect the seeds. The pomace composition of feed, receiver and seed collection chamber were presented in the Table 2.

TABLE 2

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,217.00 | 10,871.00 | 346.00 |
| 2 | Seeds | 573.74 | 257.19 | 316.55 |
| 3 | Twigs | 209.26 | 194.64 | 14.60 |
| Total | | 12,000.00 | 11,322.83 | 677.17 |

In above experiment, from 11,217 g seedless pomace in the feed, 96.90% (10,871 g) from the receiver and merely 3.09% (346 g) from seed collection chamber was recovered. Further, out of 573.74 g seeds in the feed, 316.55 g (55.17%) seeds were collected from seed collection chamber.

EXAMPLE-3

Apple pomace (1 kg) containing 64.87 g seeds, 916.87 g skin/flesh, 18.26 g twigs on DW basis and 34 L water were added to the mixing vessel (1) through opening provided at the cone shape lid (2). The pomace to water ratio was maintained at 1:34. The slurry was mixed properly with continuous agitation for dispersion of the feed contents in the water at 130 rpm for a period of 15 min. After agitation the contents of the slurry were kept undisturbed for 10 min. The seeds thus settled above the sieve, owing to their bulk density difference, were forced through the sieve holes to the seed collection chamber (10) by secondary agitation at 130 rpm for 5 min. The floating pomace was collected in the receiver through horizontal outlet (13). The experiment was run for another 11 batches and seeds thus collected in the chamber (10) were removed through the seed drain valve (11). The pomace composition of feed, receiver and seed collection chamber is given in the Table 3.

TABLE 3

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,002.00 | 10,915.00 | 87.00 |
| 2 | Seeds | 778.88 | 165.78 | 613.10 |
| 3 | Twigs | 219.12 | 200.95 | 18.17 |
| Total | | 12,000.00 | 11,281.81 | 718.27 |

From above said Table 10,915 g seedless pomace was recovered from receiver, which accounted for 99.21% with respect to feed composition of seedless pomace. Whereas, percentage of seeds in seed collection chamber was 78.36% (613.10 g) and in the receiver it was recorded as 21.23%.

EXAMPLE-4

One kilogram apple pomace containing 56.11 g seeds, 920.29 g skin/flesh, 23.6 g twigs on DW basis, were added to the vessel (1) along with 44 L water (pomace to water ratio was maintained at 1:44). The pomace contents (skin/flesh, seeds and twigs) were mixed with impeller (8) fixed to the agitator rod connected to an electrically driven motor (7) at a speed of 130 rpm for 15 min. Then the dispersed contents were allowed to settle for 10 min followed by secondary mixing for about 5 min for passing the settled seeds to the collection chamber (10) through sieve holes. After completion of secondary mixing, seedless pomace along with water was recovered from the horizontal outlet (13) and collected in a receiver. After recovering the pomace and water, another batch of 1 kg pomace was added and the process was repeated for the next 11 times. After completion of the separation process, seeds collected from chamber (10) were drained by opening the seed drain valve (11). The composition of feed and the separated material was tabulated in Table 4.

TABLE 4

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,043.00 | 10,956.00 | 87.00 |
| 2 | Seeds | 673.32 | 6.53 | 666.79 |
| 3 | Twigs | 283.20 | 257.97 | 25.71 |
| Total | | 12,000 | 11,220.5 | 779.50 |

From Table 4 it was observed that out of 11043.48 g seedless pomace in the feed, 10956.24 g was recovered in the receiver, which accounts for 99.21% recovery. However, in case of feed composition for seeds out of 673.32 g seeds, 666.79 g were recovered in the seed collection chamber accounting to 99.03% recovery.

EXAMPLE-5

Apple pomace (1 kg), containing 72.57 g seeds, 910.9 g skin/flesh, 16.53 g twigs on DW basis and water (39 L) were charged to the mixing vessel (1) through feed (3) and water inlet (4). The pomace/water ratio was 1:39. The material was agitated continuously for 15 min to disperse seeds from pomace at 90 rpm. After agitation, agitation was stopped and the seeds were allowed to settle according to their density difference above the sieve (12) for a time period of 10 min. After secondary mixing (5 min), contents were allowed to pass through sieve (12) to the seed collection chamber (10) through sieve holes. The seedless pomace having low density floated in water was collected in the receiver through horizontal opening (13). The above experiment was repeated for another 11 batches and seeds thus collected in the seed collection chamber (10) were removed through the seed drain valve (11) after completion of seed separation process. The pomace composition of feed, receiver and seed collection chamber was shown in Table 5.

TABLE 5

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 10,931.00 | 10,826.10 | 104.90 |
| 2 | Seeds | 870.84 | 24.91 | 845.93 |
| 3 | Twigs | 198.36 | 175.16 | 23.00 |
| Total | | 12,000.00 | 11,026.17 | 973.83 |

Table 5 shows that out of total feed composition for seedless pomace (10,931.00 g), 10,826.10 g was recovered in the receiver accounting 99.04% recovery. But in case of feed composition for seeds (870.84 g), trend was just opposite when compared with seedless pomace that means 845.93 g seeds were collected in the seed collection chamber with 97.06% recovery as compared to receiver (2.86%) recovery.

EXAMPLE-6

One kg apple pomace (consisting of 61.13 g seeds, 918.1 g, skin/flesh, 20.77 g twigs on DW basis) was weighed and fed to the main vessel (1) along with 39 L water in the ratio of 1:39. The contents were thus mixed properly through agitation at 160 rpm for about 15 min to disperse the feed contents. After agitation, mixing was stopped and the contents were kept undisturbed in the main vessel (1) for 10 min to settle the contents according to their bulk density. Then after secondary agitation was given at the same rpm for 5 min to force settled seeds (with higher density) above sieve to seed collection chamber (10) through sieve holes. Seedless pomace with low bulk density with respect to seeds floated in water and collected by the horizontal outlet (13) along with water. Similar process for seed separation was repeated for another 11 batches and slurry of pomace thus settled along with seeds in the seed collection chamber (10) was replaced with seeds of subsequent batches until chamber (10) was filled up completely. After completion of the separation process, the seed drain valve (11) of collection chamber (10) was opened and seeds were collected. The pomace composition of feed, receiver and seed collection chamber were given in Table 6.

TABLE 6

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,017.2 | 10,929 | 88.14 |
| 2 | Seeds | 733.56 | 30 | 703.56 |
| 3 | Twigs | 249.24 | 231.5 | 17.74 |
| Total | | 12,000.00 | 11,190.56 | 809.44 |

From above example, 10,929 g (99.20%) seedless pomace was recovered from receiver out of 11,017.20 g seed less pomace in feed. But the seed composition of seed collection chamber was 703.56 g (95.40%) with respect to the feed composition for seeds.

EXAMPLE-7

Mixing vessel (1) of seed separation unit was charged with one Kg pomace (consisting of 53.11 g seeds, 928.7 g skin/flesh, and 18.2 twigs on DW basis) and 39 L water as a carrying medium in the ratio of 1:39 through respective opening fixed on removable conical shape lid (2). The contents of above said mixture was dispersed with continuous agitation at 150 rpm. The agitation was continued for 15 min followed by a rest period (10 min) without agitation for dispersion of contents according to their bulk density difference. The seeds thus settled above the sieve (12) were passed through the seed collection chamber through sieve holes due to secondary agitation (5 min). The pomace without seeds having low bulk density were floated in water and collected through horizontal outlet (13) to the receiver. After this subsequent batches were run with similar process up to the capacity of seed collection chamber (10) by replacing the pomace slurry (Eleven batches each have one Kg pomace). At the end of complete process seeds were removed from the collection chamber (10) by using seed drain valve (11). The composition of the feed was evaluated with respect to receiver and seed collection chamber. The composition was depicted in Table 7.

TABLE 7

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,144.00 | 11,043.00 | 101.10 |
| 2 | Seeds | 637.20 | 29.31 | 607.89 |
| 3 | Twigs | 218.80 | 182.21 | 36.59 |
| Total | | 12,000.00 | 11,254.42 | 745.58 |

Table 7 illustrates that 99.09% pomace was collected from receiver from a total of 11,144.00 g seedless pomace in feed. Whereas, out of total feed composition for seeds (637.20 g), 95.39% (607.89 g) seeds were recovered from seed collection chamber as compared to 4.6% (29.31 g) in receiver.

EXAMPLE-8

Apple pomace (1 kg DW) containing 61.45 g seeds, 920.12 skin/flesh, 18.43 g twigs on DW basis and water (39 L) were fed to the vessel (1). The overall pomace to water ratio was maintained at 1:39. The above mixture was mixed properly with continuous agitation through impeller (8) fixed to the agitator rod connected by means of electric motor (7) for dispersion of the feed contents at 130 rpm for a period of 25 min. After agitating the contents of pomace, they were allowed to be settled for a period of 10 min. The seeds settled above the sieve (12) due to higher bulk density were forced through the sieve holes to the seed collection chamber (10) through secondary agitation at 130 rpm. After secondary agitation pomace skin/flesh suspended in water due to low bulk density was collected in the receiver through horizontal outlet (13). The above experiment was repeated for another 11 batches and the thus seeds collected in the seed collection chamber (10) were removed through the seed drain valve (11) at the end of the complete separation process. The pomace composition of feed, receiver and seed collection chamber were tabulated in Table 8.

TABLE 8

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,041.00 | 10,952.00 | 89.00 |
| 2 | Seeds | 737.40 | 19.40 | 718.00 |
| 3 | Twigs | 221.6 | 202.62 | 18.98 |
| Total | | 12,000.00 | 11,174.02 | 825.98 |

From Table 8 it was observed that total composition of feed for seedless pomace was 11041.00 g and out of this 10,952 g (99.19%) was recovered from receiver and 89.00 g (2.63%) seedless pomace was recovered from seed collection chamber. But in case of seed composition, 718.00 g (97.37%) g seeds were recovered from seed collection chamber and 19.40 g (2.63%) seeds were recovered from receiver, out of 737.40 g seeds in feed.

EXAMPLE-9

One kilograms apple pomace consisting of 44.87 g seeds (DW), 937.59 g (DW) skin/flesh, 17.54 g (DW) twigs was charged through the feed opening (3) along with 39 L of water (1:39 ratio of pomace to water) in the mixing vessel (1). Then the contents of pomace were mixed through continuous agitation at 130 rpm for a time period of 10 min. After initial agitation contents were allowed to be dispersed according to their bulk density. As seeds having higher bulk density were settled above sieve (12) and forced down to the seed collection chamber (10) through seed holes by means of secondary agitation (130 rpm). Seedless pomace with low bulk density float in carrying material and collected in the receiver through the horizontal outlet (13). The process was repeated for another 11 batches and at the end of complete separation process seeds were collected from the seeds collection chamber (10) through seed drain valve (11). The composition of feed, receiver, and seed collection chamber were showed in Table 9.

TABLE 9

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,251.00 | 11,144.00 | 106.89 |
| 2 | Seeds | 538.44 | 35.05 | 503.39 |
| 3 | Twigs | 210.48 | 184.29 | 26.25 |
| Total | | 12,000.00 | 11,363.34 | 636.53 |

From Table 9, it was clear that maximum percentage of seedless pomace was recovered from receiver i.e. 99.05% (11,144 g) as compared to 0.95% (106.89 g) in seed collection chamber, out of 11,251 g seedless pomace in feed. Whereas, in case of feed composition for seeds (538.44 g) 93.48% seeds were recovered from seed collection chamber and 6.51% seeds were collected from receiver.

EXAMPLE-10

One kg apple pomace having 61.93 g seeds, 919.73 g skin/flesh, 18.34 g twigs on dry weight basis was added in the mixing vessel (1) along with 39 L water. The overall ratio of pomace and water was maintained at 1:39. Apple pomace fruit skin cell wall materials and pulp surrounding gelatinous mucilage having seeds embedded therein were dispersed with continuous agitation at 130 rpm for 15 min. After initial agitation of slurry, contents were allowed to settle according to their bulk density difference for 5 min. Seeds settled above the sieve were passed to the seed collection chamber (10) through sieve holes due to secondary agitation for 5 min. Fruit skin cell wall material and pulp having low bulk density were floated in water and removed from horizontal opening (13) to the receiver. Then after mixing vessel was again loaded with one kg pomace and similar separation process were repeated till the seed collection chamber (10) was completely filled with seeds (12 batches overall). After the completion of the seed separation process, the seeds were collected from the seed collection chamber (10) by seed drain valve (11) fixed at the bottom of seed collection chamber (10). The pomace composition of feed, receiver, seed collection chamber were presented in Table 10.

TABLE 10

Composition of pomace in feed, receiver and seed collection chamber

| Sr. No. | Pomace composition | Feed (g) | Receiver (g) | Seed collection chamber (g) |
|---|---|---|---|---|
| 1 | Seedless pomace | 11,036.76 | 10,935.22 | 101.54 |
| 2 | Seeds | 743.16 | 36.49 | 706.67 |
| 3 | Twigs | 220.08 | 10.81 | 209.27 |
| Total | | 12,000.00 | 10,982.52 | 1,017.48 |

Above table (Table 10) illustrates that out of 11,036.76 g seedless pomace in feed 10,935.22 g (99.08%) and 101.54 g (0.92%) pomace was collected from the receiver and seed collection chamber respectively. Whereas, in case of seeds composition of feed 706.67 g (95.09%) was collected from seed collection chamber and 36.49 g (4.91%) from receiver.

EXAMPLE-11

In continuous mode of operation, apple pomace (12.84 kg) consisting, of 756.23 g seeds, 11,861.41 g skin/flesh, 222.36 g twigs (DW) was added to the tank along with 500 L water. The mixture was mixed and homogeneous feed was fed to the vessel (1) of seed separation unit through inclined opening (14) with a flow rate of 33.3 lit/min. The contents of the homogenous mixture were mixed continuously with agitator connected to an electrically driven motor (8) at 50 rpm for continuous dispersion and settling of the contents according to their bulk density. The apple skin cell wall material and pulp surrounding it, possessing lower bulk density, floating in the water was removed through a water inlet (4) fixed on the removable top lid (2) and collected in a separate receiver. The seeds settled at the bottom, due to higher bulk density, were passed through the sieve (12) holes to seed collection chamber (10), which were removed at the end through seed drain valve (11). The composition of feed along with receiver and seed collection chamber was given in Table 11.

TABLE 11

Composition (%) of feed and recovered products from seed separation Unit

| S. No. | Pomace composition | Feed | Receiver | Seed collection chamber |
|---|---|---|---|---|
| 1 | Seedless pomace | 92.38 | 94.30 | 11.99 |
| 2 | Seeds | 5.89 | 3.27 | 85.7 |
| 3 | Twigs | 1.73 | 2.43 | 2.31 |

From Table 11 it is deduced that the feed consisted of 11861.41 g (92.38%) seedless pomace, 756.23 g (5.89%) seeds and 222.36 g (1.73%) twigs, respectively. Whereas in case of receiver composition 94.30% seedless pomace, 3.27% seeds and 2.43% twigs and in seed collection chamber composition 11.99% seedless pomace, 85.7% seeds and 2.31% twigs were collected.

The Main Advantages of the Invention are:
1. Design is compact, portable, and easy to operate and clean.
2. Occupies minimum installation area and requires lower work force for operation
3. It is highly energy efficient and requires less process time
4. Efficient seed separation with minimum damage, thus reducing the chance of release of toxic cynoglycosides
5. Less chance of contamination from extraneous/foreign material
6. Reduced oxidation resulting in less browning of pomace
7. Low water requirement as carrier for pomace and can be recirculated
8. High recovery percentage of seeds as well as pomace
9. Seed separation unit can be used for demonstration, training and educational purpose in R&D—and educational institutes.

We claim:
1. An apparatus for the separation of seeds from fruit pulp/slurry/pomace comprising one or more cylindrical vessel(s), having a top lid comprising one or more feed inlet(s), water inlet(s), air vent(s), an agitator system(s) configured to disperse the feed contents, water and pomace seeds, twigs, flesh, pulp and skin provided at the center of said top lid, said one or more agitator system(s) having a shaft, an electric motor, and a plurality of impellers, said top lid being removeably fixed, the bottom end of the said vessel(s) comprising a seed collection chamber, comprising one or more seed drain valve(s), a sieve supporting ring being provided at the bottom of said vessel(s) to hold foldable sieve(s) having plurality of holes configured to separate various sized seeds, a plurality of baffles being provided vertically to said vessel(s) to enhance the dispersion efficiency, said vessel(s) is/are provided with plurality of supporting legs, lugs to hold the said vessel(s) vertically upright; the one or more feed inlet(s) is/are optionally provided with a lid comprising glass for monitoring the contents; one or more horizontal outlet(s) being provided at the bottom side of the said vessel(s), and an inclined pipe or a separate horizontal inlet welded at a middle portion of the vessel, wherein during a batch mode operation, the seedless pomace is removed from the one or more horizontal outlets; alternatively, during batch or continuous modes of operation, wherein a homogenous feed along with water may be fed to the said vessel either through the inclined pipe or a separate horizontal inlet welded at a middle portion of the vessel, wherein the seedless pomace is withdrawn from the said water inlet on the top lid, or alternatively, the homogenous feed may be fed to the said vessel(s) through the one or more feed inlet(s) and seedless pomace along with water may be removed continuously through the inclined pipe.

2. The apparatus as claimed in claim 1, wherein the vessel(s) is designed to have length to diameter ratio in the range of 0.5 to 5:1 to separate the seeds from the pulp/skin/flesh/twigs depending upon their settling characteristics.

3. The apparatus as claimed in claim 1, wherein the seed collection chamber is designed in either cone shape, or dished end or torrispherical or cylindrical blind end to hold the separated seeds.

4. The apparatus as claimed in claim 1, wherein one or more horizontal outlet(s) is (are) fixed above the foldable sieve at the bottom portion of the vessel(s) for withdrawing seedless pomace during batch mode of operation.

5. The apparatus as claimed in claim 1, wherein one or more horizontal outlet(s) is (are) fixed at an angle ranging from 80-90° with reference to the vessel(s) for withdrawing seedless pomace during batch mode of operation.

6. The apparatus as claimed in claim 1, wherein one or more horizontal outlet(s) is (are) fixed on any side of the vessel(s) for withdrawing seedless pomace during batch mode of operation.

7. The apparatus as claimed in claim 1, wherein the length of inclined pipes is flexibly extended by providing and fixing a suitable length of pipe configured to maintain the contents level inside the tank.

8. The apparatus as claimed in claim 1, wherein the angle of inclined pipes may be fixed in the range up to 80° with respect to the vessel.

9. The apparatus as claimed in claim 1, wherein the plurality of impellers are flexibly fixed at any desired point on the said shaft.

10. The apparatus as claimed in claim 1, wherein the plurality of impellers are adjustably fixed at any desired angle with respect to the said shaft.

11. The apparatus as claimed in claim 1, wherein the position of horizontal pipes is/are fixed above the foldable sieve.

12. The apparatus as claimed in claim 1, wherein the position of inclined pipes is/are fixed above the foldable sieve.

13. The apparatus as claimed in claim 1, wherein a plurality of sight/light glass(s) are provided on a cylindrical portion of the vessel(s) to monitor the flow dynamics, mixing and separating of the contents inside the vessel(s).

14. A method for the separation of seeds from fruit pulp/slurry/pomace, said method comprising:
    (a) adding fruit pomace, including seeds, twigs, flesh, pulp and skin and water through respective charging inlets to seed separation vessel(s) or feeding a homogenous mixture of fruit pomace and water fed to the vessel either through inclined pipe(s) or a separate horizontal inlet welded at a middle portion of the vessel;
    (b) mixing the fruit pomace and water with an agitating system to uniformly disperse/suspend the fruit pomace (containing seeds, twigs, pulp and skin) in the water;
    (c) after achieving a desired degree of dispersion of the fruit pomace containing seeds, twigs, pulp and skin and water, allowing the same to stand-still to suspend the twigs, pulp and skin in the water and settle-down the seeds at the due to difference in their bulk densities
    (d) performing secondary mixing for a shorter period, wherein a seed trap(s) retain the seeds and coerce the settled seeds above sieve through sieve hole to a seed collection chamber;
    (e) removing seedless pomace along with water:
        (i) through a horizontal outlet in a batch type operation;
        (ii) through the inclined pipe(s) in a batch type of operation;
        (iii) from a water inlet in a continuous type of operation; or
        (iv) through the inclined pipe(s) in a continuous type of operation;
    (f) removing seeds collected in a seed collection chamber through a seed drain valve at the end of the operation or when the chamber is fully occupied;
    (g) collecting the seedless pomace along with water from the horizontal outlet, the inclined pipe(s) or the water inlet; and
    (h) filtering to recover the seedless pomace from spent water, where the spent water can be recycled for a plurality of times and then purged.

15. The method as claimed in claim 14, wherein the fruit pomace and water are fed to the said vessel(s) in a ratio ranging from 1:20 to 1:55.

16. The method as claimed in claim 14, wherein the speed of the agitator is maintained in the range from 30 to 200 rpm to completely disperse the pomace lumps.

17. The method as claimed in claim 14, wherein the fruit pomace and water are initially mixed for a period ranging from 5 to 30 min in batch mode of operation.

18. The method as claimed in claim 14, wherein after mixing the fruit pomace and water, the same are allowed to settle for a time period ranging from 5 to 30 min in batch mode of operation.

19. The method as claimed in claim 14, wherein after settling period the pomace and water are secondary mixed for a period ranging from 30 sec to 15 min in batch mode of operation.

20. The method as claimed in claim 14, wherein flow rate of fruit pomace is maintained in the range from 400 to 900 g/min (DW), in the continuous mode of operation.

21. The method as claimed in claim 14, wherein the water flow rate is maintained at in the range from 8 to 50 l/min, in the continuous mode of operation.

22. The apparatus of claim 1, wherein said top lid is removably fixed by a plurality of nuts, bolts and a gasket.

23. The apparatus of claim 1, wherein the top lid is conical.

24. The apparatus as claimed in claim 1, wherein the angle of inclined pipes may be fixed in the range up to 40° with respect to the vessel.

25. The apparatus as claimed in claim 1, wherein the plurality of impellers are flexibly fixed by nut-bolts.

26. The apparatus as claimed in claim 1, wherein the position of horizontal outlet(s) is/are fixed above the foldable sieve at 1" height.

27. The apparatus as claimed in claim 1, wherein the position of inclined pipes is/are fixed above the foldable sieve at 2" height.

28. The apparatus as claimed in claim 1, wherein seed trap(s) is/are fixed inside the vessel at a point where the inclined pipe(s) is placed.

29. The apparatus as claimed in claim 28, wherein the seed trap(s) comprise two covers, an angle between the two covers being in the range of 45° to 130°.

* * * * *

UNITED STATES PATENT AND TRADEMARK OFFICE
CERTIFICATE OF CORRECTION

| | | |
|---|---|---|
| PATENT NO. | : 9,011,952 B2 | Page 1 of 1 |
| APPLICATION NO. | : 14/349305 | |
| DATED | : April 21, 2015 | |
| INVENTOR(S) | : Shashi Bhushan | |

It is certified that error appears in the above-identified patent and that said Letters Patent is hereby corrected as shown below:

Specification
In column 1 at line 34, Change "separation," to --separation--.
In column 2 at line 42, Change "30" to --30th--.
In column 2 at line 61, Change "cynogenic" to --cyanogenic--.
In column 4 at line 8, Change "sewer" to --severe--.
In column 6 at line 10, Change "unit" to --unit.--.
In column 6 at line 12, Change "unit" to --unit.--.
In column 7 at line 52, Change "operation" to --operation.--.
In column 7 at line 56, Change "operation" to --operation.--.
In column 7 at line 60, Change "operation" to --operation.--.
In column 7 at line 64, Change "tank" to --tank.--.
In column 8 at line 21, Change "(1)" to --(1).--.
In column 8 at lines 44-45, Change "in side" to --inside--.
In column 17 at line 50, Change "consisting," to --consisting--.
In column 18 at line 26, Change "cynoglycosides" to --cyanoglycosides--.
Claims
In column 19 at line 9, In Claim 3, change "torrispherical" to --torispherical--.
In column 19 at line 58, In Claim 14, change "the" to --the bottom--.
In column 20 at line 39, In Claim 21, change "wherein the" to --wherein--.

Signed and Sealed this
Nineteenth Day of January, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 9,011,952 B2 | Page 1 of 1 |
| APPLICATION NO. | : 14/349305 | |
| DATED | : April 21, 2015 | |
| INVENTOR(S) | : Shashi Bhushan | |

It is certified that error appears in the above-identified patent and that said Letters Patent is hereby corrected as shown below:

Title Page (item 72, inventor) at line 3, Change "Divya" to --Dyva--.

Signed and Sealed this
Twenty-fourth Day of May, 2016

Michelle K. Lee
*Director of the United States Patent and Trademark Office*